April 14, 1925.

H. J. McNICHOLAS

ICE CREAM FILLING MACHINE

Filed Sept. 28, 1923

1,533,125

H.J.McNicholas
INVENTOR

BY
ATTORNEY

Patented Apr. 14, 1925.

1,533,125

UNITED STATES PATENT OFFICE.

HENRY J. McNICHOLAS, OF YOUNGSTOWN, OHIO.

ICE-CREAM-FILLING MACHINE.

Application filed September 28, 1923. Serial No. 665,471.

*To all whom it may concern:*

Be it known that HENRY J. McNICHOLAS, a citizen of the United States of America, residing at Youngstown, in the county of Mahoning and State of Ohio, has invented certain new and useful Improvements in Ice-Cream-Filling Machines, of which the following is a specification.

This invention relates to ice cream filling machine, and more particularly to a machine which rapidly and economically fills containers such as used in retailing ice cream such as pints, quarts and the like.

Ice cream containers heretofore have been filled by a slow and expensive process by the retailer. It is the purpose of this machine to fill different sized containers at the factory and deliver them to the retailer in order to eliminate this extra cost and waste of time.

The principal object of this invention is to provide a rotatable block containing two recesses oppositely disposed and having a bottom in common. This bottom being provided with an opening communicating between the two receptacles.

The drawing illustrates the preferred embodiment of the invention. However, it is to be understood that in adapting the same to meet various conditions, various changes in the form, and minor details of construction may be resorted to without departing from the nature of the invention, as claimed and set forth in the drawing:

Throughout the views of the drawing similar characters designate similar parts.

Figure 1:
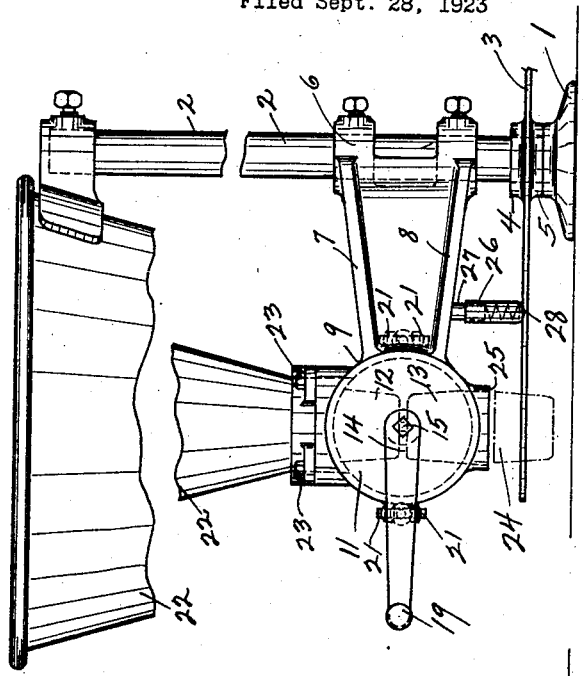
Figure 1 is a side elevation of the device with parts cut away.
Figure 2:
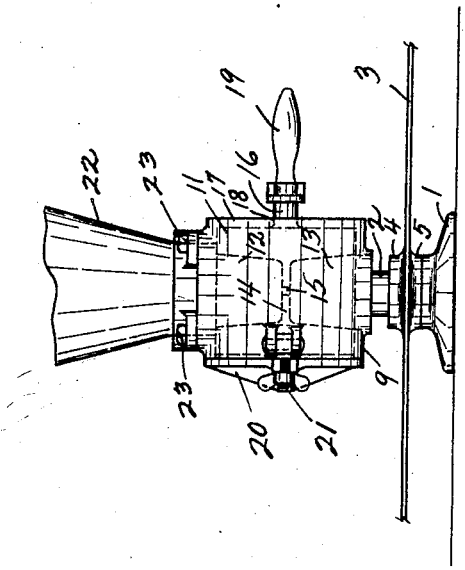
Figure 2 is a front view of the device with parts cut away.

In the preferred embodiment of my invention illustrated in the accompanying drawing, 1 indicates a base portion provided with a perpendicular support member 2. Rotatably maintained upon said perpendicular support member 2 there is provided a disc 3 provided with flanges 4 and 5 for the purpose of holding the disc 3 from wabbling. Adjustably attached to this perpendicular support member 2 there is provided a bracket 6 having two outwardly extending arms 7 and 8. These outwardly extending arms 7 and 8 are secured to a drum shaped member 9. Within this drum shaped member 9 I have provided a circular block 11 provided with oppositely disposed receptacles 12 and 13. These receptacles 12 and 13 are provided with a common bottom 14 which is provided with a small opening 15 communicating with the receptacles 12 and 13. This circular block 11 is provided with a crank arm 16 passing through an opening of an end 17 at point 18. Attached to this crank arm 16 there is a crank 19 to be used in manipulating the ice cream filler.

In assembling the device the crank 19 is removed, the circular block 11 slipped into the drum support member 9, when the detachable head 20 has been removed by means of releasing of bolts 21.

The device operates as follows:—

The ice cream is first frozen to a point where it becomes a semi-liquid, that is it will flow but not freely. It is then poured into a hopper 22 secured to the upper portion of the drum shaped member 9 by means of lugs 23. The ice cream now flows by gravity into the receptacle 12, the air in the bottom of the receptacle being forced out through the opening 15. The crank 19 is now turned one-half a circle thereby bringing the receptacle 13 up underneath the hopper 22. The ice cream now starts to flow into the receptacle 13 and air in the bottom of receptacle 13 is forced down through the opening 15 thereby relieving any partial vacuum in order to release the ice cream now reversed in receptacle 12 which falls by gravity into a container 24 which is carried by the rotatable disc 3. This disc 3 is provided with a plurality of openings near its circumference for the reception of a plurality of containers 24. In order that the container may stop underneath the opening 25 in order to receive the discharge of the cream, I have provided a stop 26 which is slidably maintained upon a downwardly extending arm 27 and functioning with a notch 28 in the upper surface of the disc 3. These notches are located upon the upper surface of the disc 3 so as to stop the disc in order to hold the container 24 directly underneath the opening 25.

What I claim is:—

In a dispensing device, a casing, a dispensing element therein having oppositely disposed material receiving pockets, there being a direct venting opening in the dispensing element between the pockets.

In testimony whereof I affix my signature.

HENRY J. McNICHOLAS.

Witnesses:
C. A. HARPMAN,
MARTHA ISAACSON.